(12) United States Patent
van den Berghe

(10) Patent No.: US 10,333,978 B2
(45) Date of Patent: Jun. 25, 2019

(54) COMMUNICATION SYSTEM, USER APPARATUS, CONTENT SOURCE AND METHOD FOR SECURE CONTENT DELIVERY

(71) Applicant: FUJITSU LIMITED, Kawasaki-shi, Kanagawa (JP)

(72) Inventor: Sven van den Berghe, Marlow Bucks (GB)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 15/368,047

(22) Filed: Dec. 2, 2016

(65) Prior Publication Data

US 2017/0163683 A1 Jun. 8, 2017

(30) Foreign Application Priority Data

Dec. 7, 2015 (GB) ..................................... 1521551

(51) Int. Cl.
*H04L 29/06* (2006.01)
*G06F 21/60* (2013.01)
(Continued)

(52) U.S. Cl.
CPC ............ *H04L 63/18* (2013.01); *G06F 21/606* (2013.01); *G06F 21/64* (2013.01); *H04L 9/0825* (2013.01);
(Continued)

(58) Field of Classification Search
CPC . H04L 63/18; H04L 63/0442; H04L 63/0428; H04L 63/083; H04L 9/0825;
(Continued)

(56) References Cited

U.S. PATENT DOCUMENTS 7,010,578 B1 3/2006 Lewin et al.
7,617,322 B2 11/2009 Ahmed et al.
(Continued)

FOREIGN PATENT DOCUMENTS

EP 0993142 4/2000
EP 2 437 458 A1 4/2012
(Continued)

OTHER PUBLICATIONS

United Kingdom Search Report dated Aug. 1, 2016 in corresponding Great Britain Application No. 1521551.0.
(Continued)

*Primary Examiner* — Ayoub Alata
(74) *Attorney, Agent, or Firm* — Staas & Halsey LLP

(57) ABSTRACT

A user apparatus configured to request and receive data divided into chunks from a content source over a network, the apparatus comprising: a network module configured to establish a secure path to the content source and to establish an unsecure path to the content source; a determination module configured to determine that a next chunk of data is required and to determine whether the next chunk of data is protected; and a request module configured to request and receive the next chunk of data, wherein the next chunk of data is requested and received via the unsecure path if or when the next chunk of data is unprotected.

21 Claims, 12 Drawing Sheets

(51) Int. Cl.
*G06F 21/64* (2013.01)
*H04L 9/08* (2006.01)
*H04L 29/08* (2006.01)

(52) U.S. Cl.
CPC ...... *H04L 63/0428* (2013.01); *H04L 63/0442* (2013.01); *H04L 63/083* (2013.01); *H04L 65/607* (2013.01); *H04L 67/10* (2013.01); *H04L 67/2842* (2013.01)

(58) Field of Classification Search
CPC ... H04L 65/607; H04L 67/2842; H04L 67/10; G06F 21/606; G06F 21/64
See application file for complete search history.

(56) References Cited

U.S. PATENT DOCUMENTS

| | | |
|---|---|---|
| 8,108,939 B2 | 1/2012 | Bhatia et al. |
| 8,397,073 B1 | 3/2013 | Richardson et al. |
| 8,429,081 B1 | 4/2013 | Dronamraju et al. |
| 2002/0035725 A1 | 3/2002 | Ando |
| 2003/0002067 A1* | 1/2003 | Miyano ............... B41J 11/663 358/1.14 |
| 2003/0177247 A1 | 9/2003 | Dunning et al. |
| 2004/0083361 A1 | 4/2004 | Noble et al. |
| 2004/0093419 A1 | 5/2004 | Weihl et al. |
| 2008/0115045 A1* | 5/2008 | Mallinson ............... G06F 21/10 715/201 |
| 2010/0169638 A1* | 7/2010 | Farris ............... H04L 63/0428 713/153 |
| 2013/0163758 A1* | 6/2013 | Swaminathan ....... H04L 9/0819 380/259 |
| 2013/0198510 A1* | 8/2013 | Rahman ............... H04L 9/321 713/155 |
| 2014/0164308 A1 | 6/2014 | Verhoeyen et al. |
| 2014/0366149 A1 | 12/2014 | Pesl |
| 2015/0110361 A1* | 4/2015 | Silverman ........... G06F 17/3028 382/110 |
| 2015/0326692 A1* | 11/2015 | Kaneko ............... G06F 21/41 713/171 |

FOREIGN PATENT DOCUMENTS

| | | |
|---|---|---|
| EP | 2 723 095 A2 | 4/2014 |
| WO | WO 2004/023716 A2 | 3/2004 |
| WO | WO 2006/058387 A1 | 6/2006 |
| WO | WO 2012/078077 A1 | 12/2012 |
| WO | WO 2015/002525 A1 | 1/2015 |

OTHER PUBLICATIONS

Extended European Search Report dated Apr. 25, 2017 in European Patent Application No. 16191603.6.

* cited by examiner

COMMUNICATION SYSTEM, USER APPARATUS, CONTENT SOURCE AND METHOD FOR SECURE CONTENT DELIVERY

CROSS-REFERENCE TO RELATED APPLICATIONS

This application claims the priority benefit of United Kingdom Application No. 1521551.0, filed on Dec. 7, 2015 in the United Kingdom Intellectual Property Office, the disclosure of which is incorporated herein in its entirety by reference.

BACKGROUND

1. Field

A user system configured to request and receive data divided into chunks from a content source over a network via secure and unsecure paths

2. Description of the Related Art

Caching of content is an important technique in the efficient running of telecommunications networks. Caching, the storing of data within a network along (or near) the path that it takes from the source to the user, reduces the total resources required to deliver content by avoiding multiple transmissions of the same data along the portion of the path between the content source and the user. The resource savings gained by caching increase the closer the cache is to the user and so the most effective caches, in terms of network resource efficiency, are located at the network edge, close to the user.

The aim of network managers is to use these near-edge caches as much as possible. However, it is also necessary for the content to be protected from unauthorized access and so near-edge caches cannot always be used.

Much of the content that is being delivered over networks is subject to rights management, in which content owners wish to restrict access to the content to certain users and to not allow open access to all users. This means that the content owner needs to exert control over the delivery of the content from all sources, including any content that has been cached within the network (or sent via an unsecure path without a cache). As most network caches are not able to apply access policies, protected content is generally not cached and will be retransmitted through the network for each user. This results in inefficient use of the network's resources.

One approach to allow caching of protected content is exemplified by Content Delivery Networks (CDNs). CDNs place surrogates of the content owner's services within a network. These surrogates act on behalf of the content owner to optimize delivery of protected content by caching content. The surrogates provide more services than caching. These additional services, including authorization and accounting, enable the content owner to trust the CDN to deliver protected content to users that are authorized. A CDN is usually backed by a formal legal arrangement between the network provider and the content owner.

CDNs are effective at optimizing content delivery and are essential to the efficient running of networks. However, the complexity of the surrogate system, such as the communication required for user authorization and the need for a formal legal arrangement, mean that the scope for their implementation is limited. There are usually just a few instances of CDN surrogates within a network and so they are placed far from the network edge, meaning that there is still a large scope for optimization of content delivery.

The standard technique to authorize users and allow them access to content, as is revealed in the prior art highlighted below, involves the creation of tokens by the content owner. These tokens are presented by the user to the cache in order to claim the right to access cached content. This means that there has to be a trust relationship between the content owner and the CDN cache. Furthermore, the CDN cache must understand the form and meaning of owner tokens and the owner must trust the cache to process the tokens correctly.

Content caching in CDNs provides a partial solution to the problem of delivering content efficiently. Although the CDN caches are located closer to the user than the content owner's servers, there is still a large portion of the network between the CDN and the user. This is because the network interconnectivity reduces closer to the user and the network takes on the characteristics of a mathematical (directed) tree, branching into isolated regions with little connectivity between the regions. There are many of these regions near the leaves (users) and so the cost of placing highly managed CDN caches in all of these regions is prohibitive.

However, the economics of caching are sufficiently effective for it to be worthwhile to place simple, lightly managed caches very close to the network edge. Indeed some new network architectures propose the placement of simple caches at every network switch. The delivery of protected content would be greatly enhanced if these caches could be exploited. These caches cannot be exploited using state of the art techniques, since they do not have the required software to manage user authorization. They may be controlled and accessed by parties that have no relationship with the content owners and so will not be trusted by the content owners.

One additional issue with lightly managed caches is the possibility of content being altered, possibly maliciously, during transmission. In the state of the art, content integrity can be assured in two ways. First, the connection itself can be protected so that any data transferred over the connection cannot be altered. However, this technique requires a distinct connection for each user's access and thus removes the ability to cache content. Alternatively, the content owner can send a token derived from the content, possibly with a secret shared between the content source and the content consumer (such as a hash). The consumer can test the token against the received content in order to determine integrity. However, open caches and multiple users mean that this technique is not feasible as both the token and the content can be modified en route.

SUMMARY

Additional aspects and/or advantages will be set forth in part in the description which follows and, in part, will be apparent from the description, or may be learned by practice of the embodiments.

Embodiments consider a new approach for delivering content that requires rights protection to users over untrusted networks. The method builds on techniques in which content is split into two or more streams in such a way that access to all of the streams is required in order to use the content. In embodiments, at least one of the streams may be delivered over a protected channel to allow rights assertion and integrity checking. The remaining stream(s), which represent the bulk of the content, may be delivered over unprotected, but resource efficient, channels.

Embodiments propose two novel schemes for splitting the content into streams, with at least one of the streams having low volume and most or all of the streams being required for content use.

Furthermore, embodiments can enable the use of caching mechanisms throughout the network. As discussed above, small, simple caches that are close to the network edge cannot be exploited by the current state of the art, since there are no guarantees that content will be delivered only to authorized users and that users will receive the intended content. Embodiments attempt to overcome this problem and allow for the caching of content throughout the network, which increases the efficiency of network use and delivers a better service to users. It is desirable to allow extensive use of content caching of protected content in all caches available throughout the network, which will increase the efficiency of network resource use.

According to an embodiment of one aspect, there is provided a user apparatus configured to request and receive data divided into chunks from a content source over a network, the apparatus comprising: a network module configured to establish a secure path to the content source and to establish an unsecure path to the content source; a determination module configured to determine that a next chunk of data is required and to determine whether the next chunk of data is protected; and a request module configured to request and receive the next chunk of data, wherein the next chunk of data is requested and received via the unsecure path if the next chunk of data is unprotected.

A user apparatus may also be referred to as a user or as a content consumer.

The user apparatus requests and receives content which has been split into chunks from a content source. The chunks of data are determined to be protected or unprotected by the user apparatus. The status of a chunk of data as protected or unprotected determines whether the chunk of data is requested and received via the secure or the unsecure path. If it is determined that the next chunk of data is unprotected, then it is requested and received via the unsecure path. In a preferred embodiment, the next chunk of data is requested and received via the secure path if the next chunk of data is protected.

The chunks of data are split and categorized in such a way that, for example, all of the chunks are required in order for the content to be used and/or the unprotected chunks cannot be used without the protected chunks. Thus the unprotected chunks of data may be delivered to the user via the unsecure path since it does not matter if the content is available to unauthorized users.

A chunk of data may refer to any piece or segment of content or data that is to be transferred from a content source to a user. Accordingly, a chunk of data may also be referred to as a piece/segment of content/data. The size and number of chunks or pieces that the data is split into may depend on any number of factors, such as, for example, the amount of content, the network, the content source, the user apparatus, etc.

The status of the chunks of data is set as protected or unprotected by the content source. The allocation of a chunk of data as protected or unprotected will be dependent on a number of factors, such as, for example, type of content, encryption method, amount of data, number of frames, importance of content, etc. Alternatively or additionally, the chunks of data may be thinned, in which every n'th chunk of data is marked as and considered protected and the remaining chunks of data are marked as unprotected.

A secure path is a connection (between a content source and a user) that is known to be secure and/or is trusted by the content source. That is, the content source (or content owner) trusts that the content will only be delivered to authorized users and that users will receive the intended content. A secure path ensures the rights of the content owner and makes sure that the content is only delivered to or accessed by intended and authorized users. Conversely, an unsecure path is a connection that is not secure and/or trusted by the content source and thus the rights of the content owner cannot be assured.

In an alternative arrangement, the request module is configured to request authorization from the content source via the secure path and, when authorization is given, to receive an authorization token from the content source via the secure path. The request module is further configured, when authorization is given, to request and receive a protected chunk of data via the unsecure path using the authorization token. Thus, the secure path may be used by the user apparatus to establish authorization with the content source and to receive an authorization token from the content source. The authorization token may be, for example, a hash. The transfer of the authorization token via the secure path ensures that the correct user apparatus receives it and that it has not been modified, ensuring integrity of the token.

Once authorization of the user apparatus has been established, the authorization token may be used to request and receive chunks of data, both protected and unprotected, via the unsecure path. The authorization token is secure and can, for example, limit access to certain content. The token may also limit access to the user to whom it was issued and limit on other criteria, such as, for example, duration (e.g. invalid after a certain time) or location (e.g. only valid if presented at a particular place). The authorization token may therefore be used to ensure the rights of the content owner and to ensure that protected chunks of data are not accessed by unauthorized users. The authorization token may effectively be seen as an alternative to the secure path, and so the secure path does not need to be maintained for the duration of the content transfer. After the initial authorization and receipt of the authorization token, the secure path may be released.

Furthermore, it is preferable that, when authorization is given, the request module is configured to negotiate a public and private key pair with the content source. The request module is configured to request and receive encrypted chunks of data using the public key. The user apparatus further comprises a combining module configured to decrypt the received encrypted chunks of data using the private key. A public and private key pair may be used to encrypt the protected chunks of data and to therefore provide further security. During the initial authorization period, the user requests authorization via the secure path. Once authorization is given, the user apparatus negotiates a public and private key pair. The public key may then be used as an authorization token to request protected chunks of data via the unsecure path. The protected chunks of data may be encrypted by the content source using the public key before being transferred to the user via the unsecure path. The private key may then be used by the user apparatus to decrypt the protected chunks of data, which can then be combined with the unprotected chunks of data. Once the user apparatus has negotiated the public and private key pair, the secure path is not required for the remaining duration of the content transfer and so may be released after the initial authorization period.

The determination module may determine whether the next chunk of data is protected using a streaming protocol, the streaming protocol including a list of protected chunks of data. The streaming protocols may be standard media streaming protocols, dependent on, for example, the network, the content being streamed and/or the content source. The streaming protocols may be used to determine whether the next chunk of data is required and whether the next chunk of data is protected or unprotected. For example, a manifest file included in standard streaming protocols may be extended to include information indicating the protected chunks of data.

In a preferred embodiment, the request module is configured to request the next chunk of data via the secure path if an error message is received when the next chunk of data is requested via the unsecure path. If the user receives an error message in response to a request for the next chunk of data made via the unsecure path, the next chunk of data may have been incorrectly determined as unprotected by the user apparatus. It may therefore be assumed that the chunk of data is protected and so should be requested and received via the secure path. Similarly, an error message may be returned if a request for an unprotected chunk of data is made via the secure path. If an error message is returned when the next chunk of data is requested via the secure path, the request module may then request the next chunk of data via the unsecure path Preferably, the request module is configured to simultaneously request and receive chunks of data via the secure path and the unsecure path. That is, chunks of data may be requested and received through both paths at the same time, as required by the user apparatus.

According to embodiments, it is preferable that the request module is configured to receive a content hash key from the content source via the secure path and, when a chunk of data is received via the unsecure path, to check the integrity of the received chunk of data using the content hash key. Content integrity may be assured using a content hash key. The hash key is received by the user apparatus via the secure path to ensure that the hash key is not modified.

Preferably, the user apparatus further comprises: a combining module configured to combine the chunks of data received from the content source. The received chunks of data, both protected and unprotected, may be combined in the appropriate order by the user apparatus for use.

The secure and unsecure paths between the content source and user may be direct or indirect. For example, the unsecure path may include one or more caches for caching data along the path. The secure path may also include one or more caches, however, in order for the path to be secure, these caches must be trusted and/or controlled by the content source. CDN surrogates may also be considered as a form of cache and may be included in the secure path. It is preferable however that the secure path is a direct path between the user apparatus and the content source.

The data requested and received by the user apparatus from the content source may be any appropriate data. In preferred embodiments the data is video data comprising key frames and delta frames, and the key frames are protected chunks of data and the delta frames are unprotected chunks of data or vice-versa. Video content comprises a number of frames which are usually defined as either key frames or delta frames. Each frame or a set number of frames may be considered as a chunk of data and allocated as protected or unprotected by the content source. Allocation of frames as protected or unprotected may depend on, for example, the size of the frames or the importance of the frames.

The video data may be further categorized as I-frames, B-frames and P-frames, wherein the key frames are I-frames and the delta frames are B-frames and P-frames. Thus, the I-frames may be allocated as protected chunks of data and the B-frames and P-frames as unprotected chunks of data, or vice-versa.

Alternatively, or additionally, the data may comprise encoded chunks of data and one or more decoding tables, in which the decoding tables are protected chunks of data and the encoded chunks of data are unprotected chunks of data. The chunks of data may be compressed and encoded by the content source, with the user apparatus requiring decoding tables to decode the data and reconstruct the original content. Each chunk of data may be encoded using a decoding table and the decoding table for each chunk of data may be different or the same as the decoding tables for other chunks of data. The encoded chunks of data may then be allocated as unprotected chunks of data and can be consequently requested and received via the unsecure path. The decoding tables may be allocated as protected chunks of data, to be requested and received via the secure path. Alternatively, the encoded chunks of data may be protected chunks of data and the decoding tables may be unprotected chunks of data.

In a corresponding method embodiment, there is provided a method in a user apparatus of requesting and receiving data divided into chunks from a content source over a network, the method comprising: establishing a secure path to the content source and establishing an unsecure path to the content source; determining that a next chunk of data is required and determining whether the next chunk of data is protected; and requesting and receiving the next chunk of data, wherein the next chunk of data is requested and received via the unsecure path if the next chunk of data is unprotected.

Embodiments also extend to a content source apparatus that can be used independently of or in conjunction with the user apparatus as defined hereinbefore. Thus, in an embodiment of a further aspect, there is provided a content source apparatus configured to deliver data to a user, the apparatus comprising: a network module configured to establish a secure path to the user and to establish an unsecure path to the user; a splitting module configured to split the data into two or more chunks; a classifier module configured to mark the chunks of data as protected or unprotected; and an input/output module configured to receive a request for a chunk of data and to transmit the chunk of data, wherein the chunk of data is transmitted via the unsecure path if the chunk of data is unprotected. In a preferred embodiment, the request for a chunk of data may be received from the user and the chunk of data may be subsequently transmitted to the user, provided that the request is received via the appropriate path. In some embodiments, the request may be received from or via a cache and the chunk of data may be subsequently transmitted to or via the cache.

The content source splits the content into a number of chunks and receives requests for the chunks of data from a user via the secure and unsecure paths. The chunks of data are allocated as protected or unprotected, typically by the content source, and the status of a chunk of data determines whether the chunk of data is transferred to the user via the secure or the unsecure path. If the chunk of data is unprotected and requested via the unsecure path, then it is transmitted to the user via the unsecure path. In a preferred embodiment, the chunk of data is transmitted via the secure path to the user if the chunk of data is protected.

As stated above, the chunks of data are split and categorized by the content source in such a way that, for example, all of the chunks are required in order for the content to be used and/or the unprotected chunks cannot be used without the protected chunks. The content source may also be referred to as a content owner.

In a preferred embodiment, the input/output module is configured to refuse a request for a protected chunk of data received via the unsecure path. Conversely, the content source may refuse a request for an unprotected chunk of data that is received via the secure path.

In an alternative embodiment, the input/output module is configured to receive an authorization request from the user via the secure path and to authorize the user by transmitting an authorization token to the user via the secure path. The input/output module is further configured, when authorization is given, to transmit a protected chunk of data via the unsecure path when the chunk of data is requested using the authorization token.

Thus, the secure path may be used to authorize the user apparatus and to transmit an authorization token to the user. Once authorization of the user apparatus has been established, the authorization token may be used by the user to request chunks of data, both protected and unprotected, via the unsecure path and the chunks of data are transmitted to the user via the unsecure path. The secure path does not need to be maintained for the duration of the content transfer and so may be released after the initial authorization period.

Furthermore, when authorization is given, the input/output module may be configured to negotiate a public and private key pair with the user. The classifier module is configured to encrypt chunks of data using the public key; and the input/output module is configured to transmit the encrypted chunks of data to the user when requested using the public key. A public and private key may be used to provide further security to the chunks of data, with the chunks of data being encrypted using the public key before being negotiated to the user. The public and private key pair may preferably be transmitted to the user via the secure path.

It is preferable for the input/output module is configured to simultaneously receive requests for and transmit chunks of data via the secure path and the unsecure path. That is, requests for chunks of data may be received and chunks of data may be transmitted via both paths at the same time, as required.

According to a preferred embodiment, the input/output module is configured to transmit a content hash key for checking the integrity of chunks of data to the user via the secure path. The user may use the content hash key transmitted by the content source to check content integrity. The hash key is transmitted to the user apparatus via the secure path to ensure that the hash key is not modified.

In a preferred embodiment, the classification of chunks of data as protected or unprotected is based on their importance, in which the classifier module is configured to mark all low importance chunks of data as unprotected and/or to mark all high importance chunks of data as protected, i.e. higher priority chunks of data may be allocated as protected chunks of data and lower priority chunks of data as unprotected. For example, since the content is split into chunks so that all of the chunks are required in order for the content to be used, an important chunk of data may be a chunk of data that is integral for the content to be used. In a situation where the data is video data, a high importance chunk of data could be important scenes and/or frames. A low importance chunk of data may be, for example, inserted advertisements or final credits. Whether the chunks are of high importance or low importance is hence established by one or more predetermined criteria, including using one or more thresholds and/or data classification techniques.

In this embodiment, the remaining chunks of data that are not automatically allocated as protected or unprotected (due to being be high or low importance) may be thinned. The classifier module is, for example, configured to thin the chunks of data that have not been marked as protected or unprotected by marking every n'th chunk of data as protected and marking all other chunks of data as unprotected.

As discussed above in respect of the user apparatus, the secure and unsecure paths may be direct or indirect. However, it is preferable that the secure path is a direct path between the content source and the user apparatus.

The data requested by and transmitted to the user may be any suitable data and in preferred embodiments is video data comprising key frames and delta frames. The key frames may be protected chunks of data and the delta frames may be unprotected chunks of data or vice-versa. The video data may be split into I-frames, B-frames and P-frames, wherein the key frames are I-frames and the delta frames are B-frames and P-frames.

Alternatively or additionally, the data may comprise encoded chunks of data and one or more decoding tables. The decoding tables may be protected chunks of data and the encoded chunks of data may be unprotected chunks of data, or vice-versa.

In a corresponding method embodiment, there is provided a method in a content source apparatus of delivering data to a user, the method comprising: establishing a secure path to the user and establishing an unsecure path to the user; splitting the data into two or more chunks; marking the chunks of data as protected or unprotected; and receiving a request for a chunk of data and transmitting the chunk of data, wherein the chunk of data is transmitted via the unsecure path if the chunk of data is unprotected.

According to an embodiment of a still further aspect, there is provided a communications system comprising a user apparatus and a content source apparatus. The user apparatus is connected to the content apparatus via a secure path and via an unsecure path. The content source apparatus is configured to split data into two or more chunks of data, to mark the chunks of data as protected or unprotected, to receive a request for a chunk of data from the user and to deliver the data to the user; and the user apparatus is configured to determine whether a next chunk of data is required and to determine whether the next chunk of data is protected, and to request and receive the next chunk of data via the unsecure path if the next chunk of data is unprotected. It is preferable that the user apparatus is configure to request and receive the next chunk of data via the secure path if the next chunk of data is protected.

In a preferred embodiment of the communications system, the unsecure path includes a cache to cache one or more chunks of data and the user apparatus is connected to the content source apparatus via the cache. The cache is configured to request and receive chunks of data that are not protected from the content source apparatus and to transmit the chunks of data to the user apparatus in response to a request from the user apparatus.

Thus, according to this embodiment, the communications system utilizes caches located, for example, throughout the network in order to improve network performance. One or more caches may form part of the unsecure path, with unprotected chunks of data being cached in addition to or instead of being directly transferred from the content source to the user apparatus. If the unsecure path includes a cache, the user apparatus requests and receives unprotected chunks of data from the cache, via the unsecure path. If the requested chunk of data is stored in the cache, then the cache transmits the chunk of data to the user. However, if the requested chunk of data is not stored in the cache, then the cache will request and receive the unprotected chunk of data from the content source, via the unsecure path, before transferring it to the user. The content source may also transmit unprotected chunks of data to the cache as a result of previous requests or because the cache preloaded by some omniscient process.

The unprotected chunks of data may also be referred to as cacheable chunks of data. It is preferable that the cache is located closer to the network edge and/or the user apparatus than to the content source, in order to increase the network resource efficiency.

The communications system may further comprise one or more other user apparatuses. The unprotected chunks of data stored in the cache may be accessed by the other user apparatuses in the communications system. Accordingly, the unprotected chunks of data stored in the cache and transferred to the user may be chunks of data that have previously been requested by other user apparatuses.

Embodiments also extend to a method carried out in the communications system as defined hereinbefore. Thus, in an embodiment of a still further aspect, there is provided a method for use in a communications system, comprising a content source splitting data into two or more chunks of data, marking the chunks of data as protected or unprotected, receiving a request for a chunk of data from a user and delivering the data to the user; and the user determining whether a next chunk of data is required and determining whether the next chunk of data is protected, and requesting and receiving the next chunk of data via an unsecure path if the next chunk of data is unprotected.

According to embodiments, content owners are able to cache content throughout the network whilst retaining the ability to protect the content owner's rights. Additionally, embodiments allow content consumers to check content integrity even if the content is delivered over an untrusted network.

According to embodiments that utilize caches in the network, it is not necessary for caches in the network to be trusted by the content source since content is delivered from more than one path and, in some embodiments, from more than one source. This means that caches in the network, even those at the network edge, may be utilized to ensure efficient use of the network resources and improve network performance.

According to an embodiment of an aspect, content integrity can be assured by sending tokens (e.g. content hash key) over the protected route, ensuring that they are not modified.

The content may be distributed between the paths and/or sources in such a way as to make any one stream by itself invalid. Examples of ways to split the content are discussed in the detailed description. One content source is protected and is controlled by the content owner (or its delegates). This source will check the user's access to the content and will return the protected stream only if the user is authorized to access the content. Once access to the protected stream is granted, the user will access the unprotected stream via the other path and possibly from another source, such as a cache. Note that since access to both streams is required to use the content there is no need to authorize the second content. In order for caching to be effective the protected stream, which is delivered without caching, should be a small proportion of the total content.

The embodiments can be implemented in digital electronic circuitry, or in computer hardware, firmware, software, or in combinations of them. The embodiments can be implemented as a computer program or computer program product, i.e., a computer program tangibly embodied in a non-transitory computer readable storage medium, an information carrier, e.g., in a machine-readable storage device or in a propagated signal, for execution by, or to control the operation of, one or more hardware modules. A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a communication system environment. A computer program can be deployed to be executed on one module or on multiple modules at one site or distributed across multiple sites and interconnected by a communication network.

The embodiments are described in terms of particular embodiments. Other embodiments are within the scope of the following claims. For example, the steps can be performed in a different order and still achieve desirable results.

The apparatus according to preferred embodiments is described as configured or arranged to carry out certain functions. This configuration or arrangement could be by use of hardware or middleware or any other suitable system. In preferred embodiments, the configuration or arrangement is by software.

Elements have been described using the terms "network module", "determination module", "request module", "input/output module", "classifier module" and "splitting module". The skilled reader will appreciate that these terms and their equivalents may refer to parts of the user apparatus, content source apparatus or cache that are spatially separate but combine to serve the function defined. Equally, the same physical parts of the user apparatus, content source apparatus or cache may provide two or more of the functions defined.

For example, separately defined functions of the user apparatus and/or content source apparatus may be implemented using the same memory and/or processor as appropriate. The input/output module and network module of the content source apparatus may be implemented with separate inputs and outputs or as a transceiver. Moreover the input/output module and network module may be part of the same unit. Similarly, the network module and request module of the user apparatus may be implemented with separate inputs and outputs or as a transceiver and/or may be part of the same unit.

SUMMARY

Embodiments may be able to allow caching of protected content in untrusted caches located throughout a network, and even at the network edge, whilst allowing the content owner control over access to the content.

According to embodiments, content can be split into one or more streams so that access to all the streams is required in order to use the content. At least one stream may be delivered through a trusted (secure) channel, allowing authorization, and the remaining streams may be delivered through untrusted (unsecure) channels.

Embodiments may allow:

content to be transferred through an untrusted network;

part of the content to be delivered over a protected connection;

content to be cached in the network;

cached content to be used by multiple users in untrusted caches;

the content owner to send proofs for the validity of content delivered over an untrusted route (e.g. black hashes);

the simultaneous use of two (or more) network connections to access content;

use of context-dependant content thinning; and video streams to be split into key-frames and other frames.

Features and sub-features of the system and apparatus aspects may be applied to the method aspects and vice versa.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
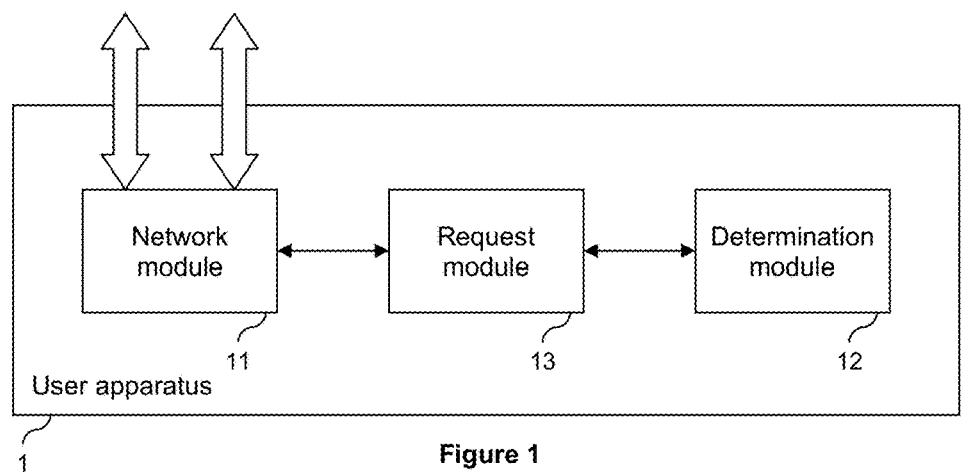
FIG. 1 is an apparatus block diagram representing a user apparatus according to a general embodiment.

Reference will now be made in detail to the embodiments, examples of which are illustrated in the accompanying drawings, wherein like reference numerals refer to the like elements throughout. The embodiments are described below by referring to the figures.

FIG. 1 is an apparatus block diagram representing a user apparatus according to a general embodiment. The user apparatus 1 comprises a network module 11, a determination module 12 and a request module 13. The network module 11 establishes a secure path/connection and an unsecure path/connection with a content source apparatus 2. The determination module 12 determines whether a next chunk of data from the content source apparatus 2 is required. If or when it is determined that a next chunk of data is required, the determination module 12 determines whether or not the next chunk of data is protected or unprotected. The request module 13 is effectively an input/output module. It requests and receives the next chunk of data. If or when it is determined that the next chunk of data is unprotected, the request module 13 requests and receives the next chunk of data via the unsecure path. The request module 13 and network module 11 may be provided in the same part.

Figure 2:
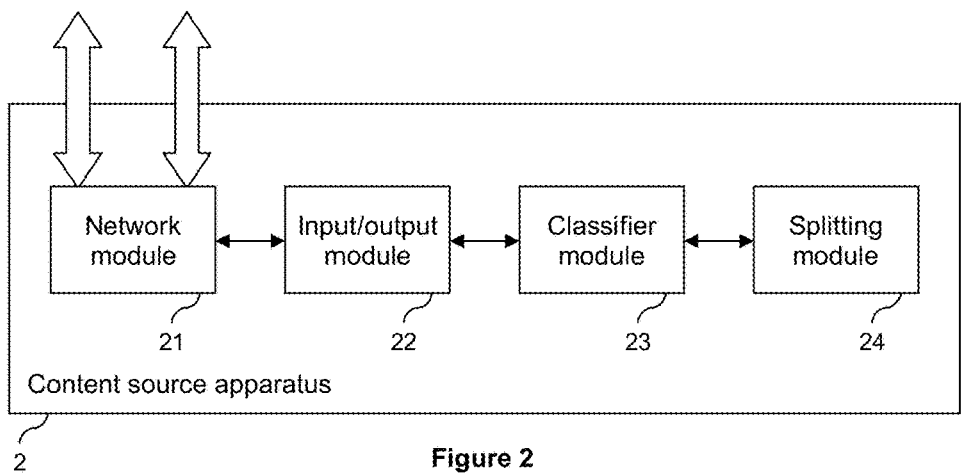
FIG. 2 is an apparatus block diagram representing a content source apparatus according to a general embodiment.

FIG. 2 is an apparatus block diagram representing a content source apparatus according to a general embodiment. The content source apparatus 2 comprises a network module 21, an input/output module 22 (which may be provided in the same part as the network module), a classifier module 23 and a splitting module 24. The network module 21 establishes a secure path/connection and an unsecure path/connection with a user apparatus 1. The splitting module 24 splits content/data into two or more chunks/pieces of content/data. The classifier module 23 allocates and marks the chunks of data as either protected or unprotected. The input/output module 22 receives requests for chunks of data from a user apparatus 1. If or when the requested chunk of data is unprotected, then the input/output module 22 transmits the chunk of data to the user apparatus 1 via the unsecure path.

Figure 3:
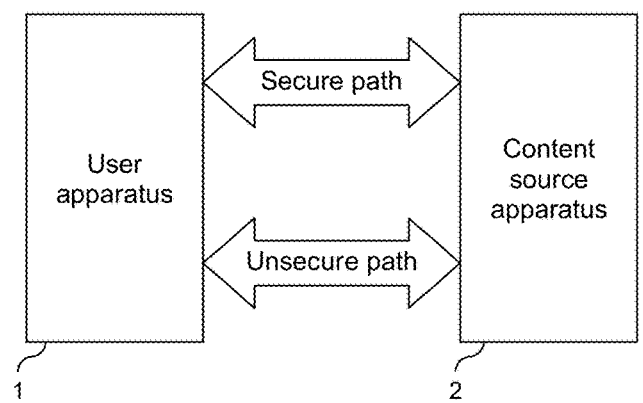
FIG. 3 is a system diagram representing a general embodiment.

FIG. 3 is a system diagram representing a general embodiment. The communications system comprises a user apparatus 1 and a content source apparatus 2. The user apparatus 1 and the content source apparatus 2 are connected via a secure path and an unsecure path.

Figure 4:
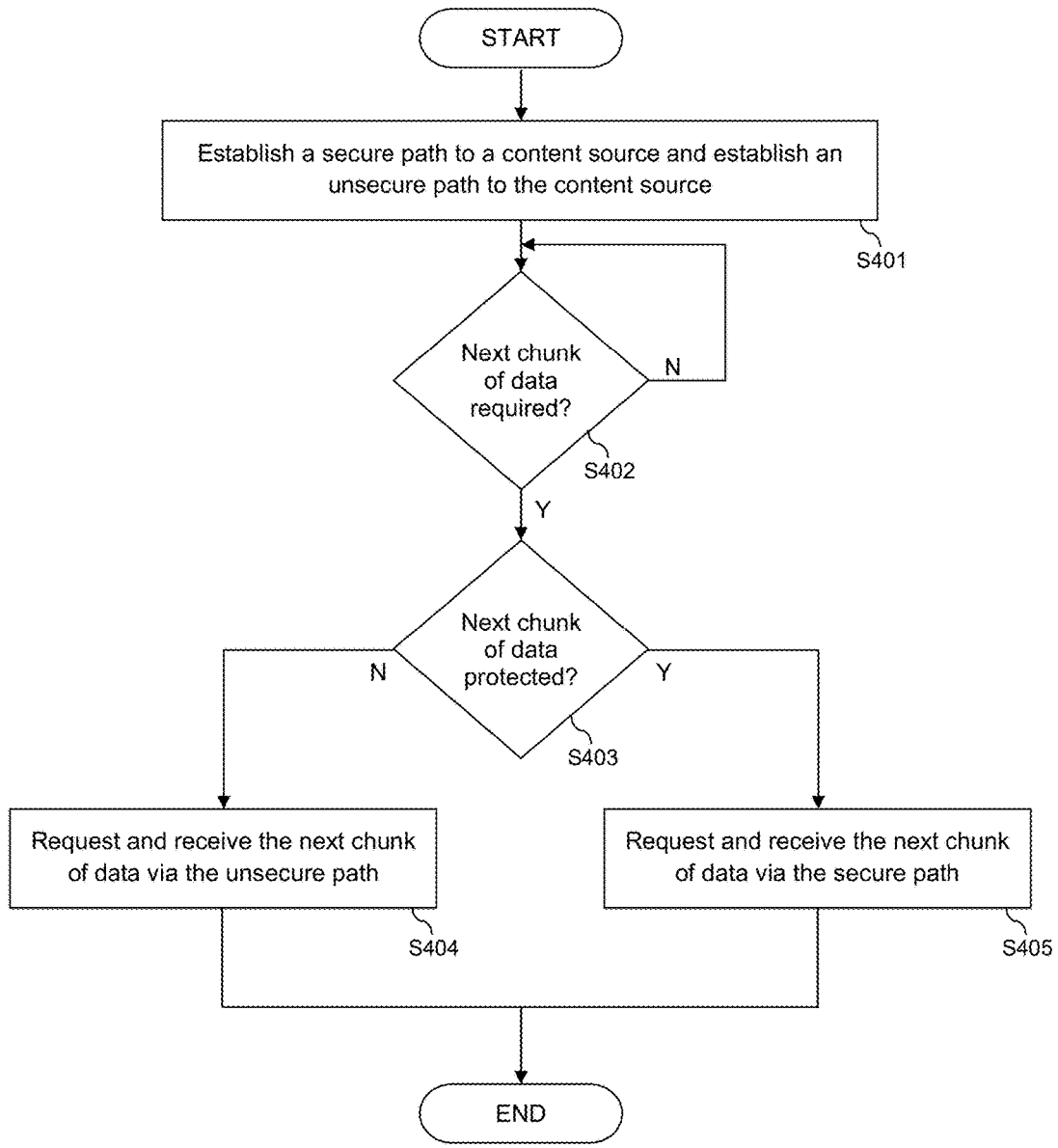
FIG. 4 is a flow chart of a method in the user apparatus according to an embodiment of an aspect.

FIG. 4 is a flow chart of a method in the user apparatus according to an embodiment of an aspect. At step S401, a secure path is established with a content source and an unsecure path is also established with the content source. It is determined at step S402 if or when a next chunk of data is required from the content source. When it is determined that a next chunk of data is required, the process proceeds to step S403, at which it is determined whether or not the next chunk of data is protected. If or when the next chunk of data is not protected, then it is requested and received via the unsecure path at step S404. However, if or when it is determined at step S403 that the next chunk of data is protected, then the next chunk of data is requested and received via the secure path at step S405.

Figure 5:
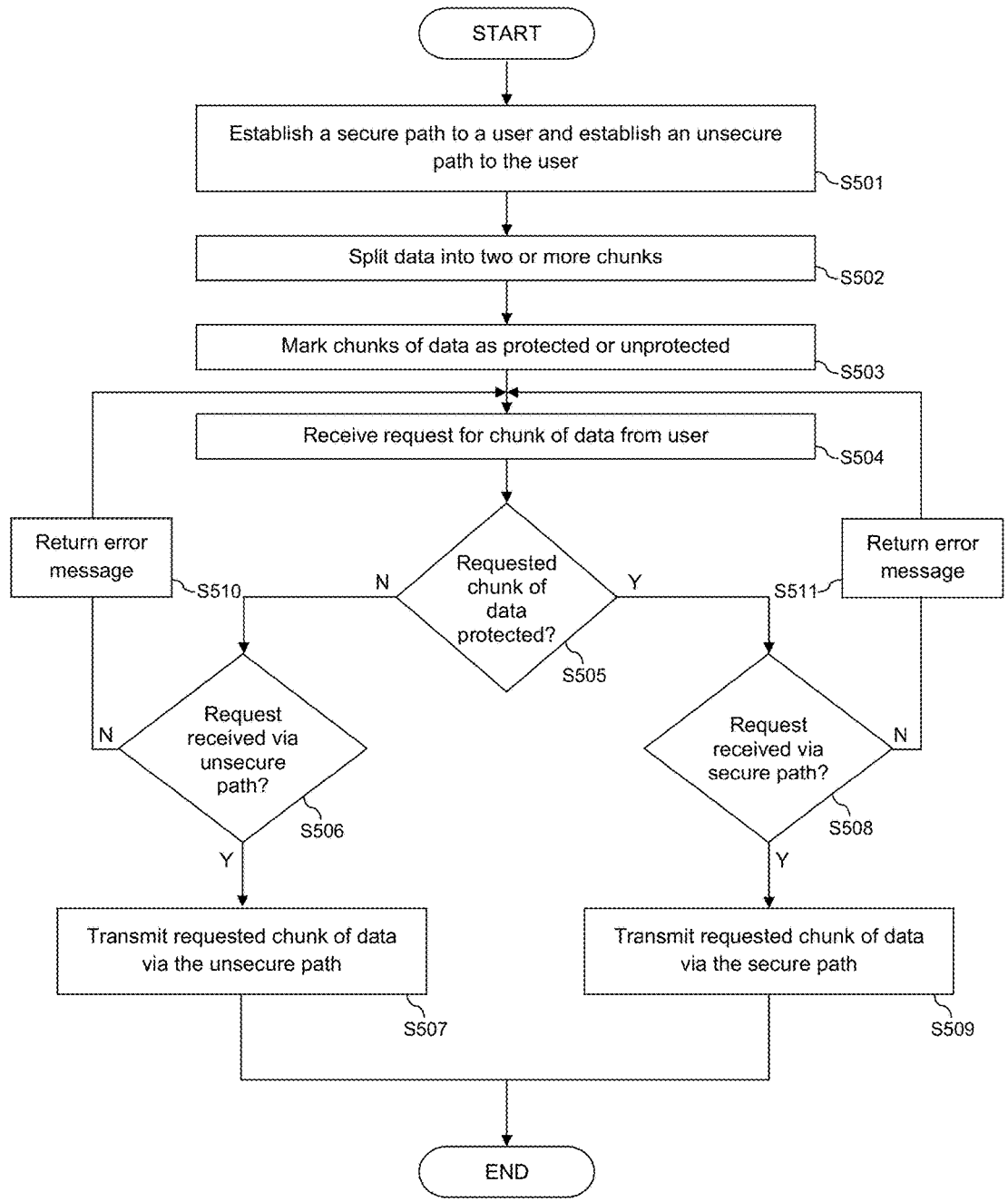
FIG. 5 is a flow chart of a method in the content source apparatus according to an embodiment of an aspect.

FIG. 5 is a flow chart of a method in the content source apparatus according to an embodiment of an aspect. At step S501, a secure path is established with a user and an unsecure path is also established with the user. Data is split into chunks at step S502 and the chunks of data are marked as protected or unprotected at step S503. At step S504 a request for a chunk of data is received from the user and it is determined whether or not the requested chunk of data is protected at step S505. If the requested chunk of data is not protected, then at step S506 it is determined whether the request was received via the unsecure path. If the request for the unprotected chunk of data was received via the unsecure path, the process proceeds to step S507, at which the requested chunk of data is transmitted to the user via the unsecure path. Otherwise, if the unprotected chunk of data is not requested via the unsecure path (no at step S506), an error is returned at step S510. In this embodiment, unprotected data requests should always be received over the unsecure path and so an error message is returned if requests for unprotected data are received via the secure path. If at step S505 the requested chunk of data is determined to be protected, the process proceeds to step S508. Here it is determined whether the request for the protected chunk of data was received via the secure path and, if it was, the requested chunk of data is transmitted to the user via the secure path at step S509. Similarly to step S506, if the request for the protected chunk of data was not received via the secure path (no at step S508), an error is returned at step S511. In this embodiment, protected data requests should always be received over the secure path and so an error message is returned if requests for protected data are received via the unsecure path.

According to a preferred embodiment, a request from a user for a protected chunk will only receive a reply (with the chunk) if it is received over a secure path. This may not be to show that a chunk is protected, as this is a decision that is made by the content owner, but to ensure that the response over the same path is protected.

Figure 6:
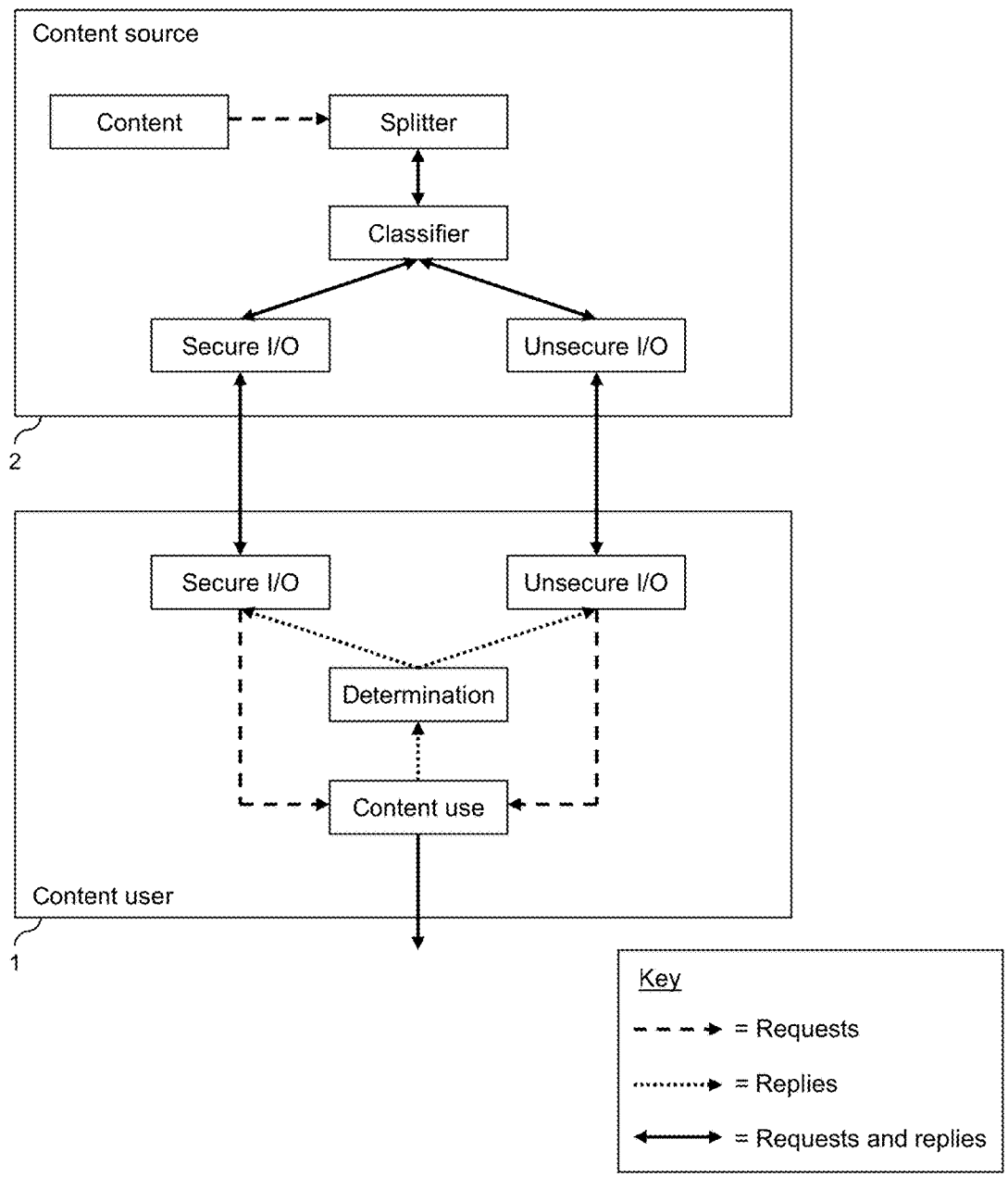
FIG. 6 is a system block diagram of the content source apparatus and the user apparatus according to an embodiment of an aspect.

FIG. 6 is a system block diagram of the content source apparatus and the user apparatus according to an embodiment of an aspect. The system comprises a content source 2 and a content user 1 connected via a secure path and an unsecure path.

The content source 2 is the origin of the content that the user requests and comprises content, a splitter, a classifier, secure I/O and an unsecure I/O. The secure I/O and unsecure I/O may be effectively provided separately, by a different part, but it is more likely that the separation is nominal, so that the secure and unsecure I/O are implemented as different attributes of the same functionality. The content may typically be large files that take a while to be transferred or consumed. They are not transmitted in one transaction but are rather separated into segments and each segment is transmitted in response to a request from the user 1. The splitter splits the content into segments for transmission. The way the content is split may be dependent on a number of factors, such as, for example, the content type and the characteristics of the transmit process. The splitting can be executed on-line as each request is received or off-line so that the content is stored in segments. The classifier determines whether each segment of data should be transmitted over a secure or unsecure connection. It also receives requests from users and determines if the requests have been received over the correct channel. For example, a request for secure segments received over an unsecure channel will be refused. The secure I/O manages a secure connection with the user of the content 1, receives requests from the user 1 and transmits content to the user 1. Similarly, the unsecure I/O manages an unsecure connection with the user of the content 1, receives requests from users and transmits content to the user 1.

The content user 1 is the origin of a request for content, such as, for example, to view a video stream. The content user 1 comprises a secure I/O, an unsecure I/O, determination and content use.

Similarly to the content source 2, the secure I/O and unsecure I/O manage a secure and unsecure connection with the source of the content, respectively. The secure I/O and unsecure I/O also send requests to the content source 2 and receive content from the content source 2. The determination determines if the next segment to be requested should be transferred over a secure or unsecure connection. Content use manages delivery of content to the user 1, merging segments into a stream and decrypting if necessary.

Figure 7:
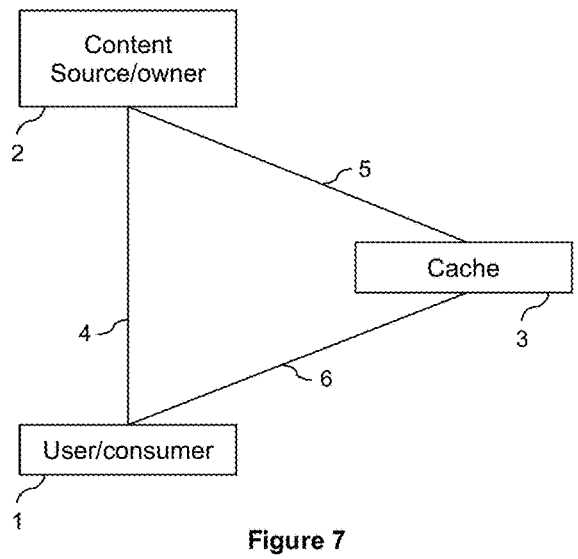
FIG. 7 is a block diagram showing the main components and their interactions according to an embodiment of an aspect.

FIG. 7 is a block diagram showing the main components and their interactions according to an embodiment of an aspect. In this preferred embodiment, the system includes caches 3 in the network that form part of the unsecure path between the content owner 2 and the user 1. The owner of the content 2 wishes to deliver content to users 1, restricting access to authorized users 1 while making use of any content caches 3 in the network to ensure efficient delivery. Users 1 wishing to access content initially contact the owner 2 through a protected/secure route 4. The protected route 4 is used to pass the required information from the user 1 to the content owner 2 to achieve authorization and is also used to transmit part of the requested content directly to the user 1. The user 1 accesses the remainder of the content from caches 3 in the network via an unprotected/unsecure path 6. If the cache 3 holds the requested content, it is returned to the user 1 via the unprotected path 6. If the cache 3 does not have the content, it requests the missing content from the owner 2 over an unprotected/unsecure path 5. On receipt of the content from the owner 2, the cache 3 caches the content and transmits it to the user 1 via the unprotected path 6. Content hashes may be used to check the integrity of the data sent from the cache 3. The content hashes are sent over the protected route 4 to ensure that they are not modified.

It is not essential to embodiments that a cache is included in the network. However, preferred embodiments and implementations thereof will most likely be in systems that include one or more caches. Placing a cache in the content path has great benefits to the network performance and embodiments are capable of making the deployments of caches more likely. The costs of securing a path (such as processing overhead for encryption) over using an unsecured path are capable of making it a viable option (particularly if one of the end points is a low powered device).

The effectiveness of a cache depends on how often the data is in the cache before the user requests it. A good cache will have the content already available, either because another user made a previous request or because the cache preloaded by some omniscient process.

Figure 8:
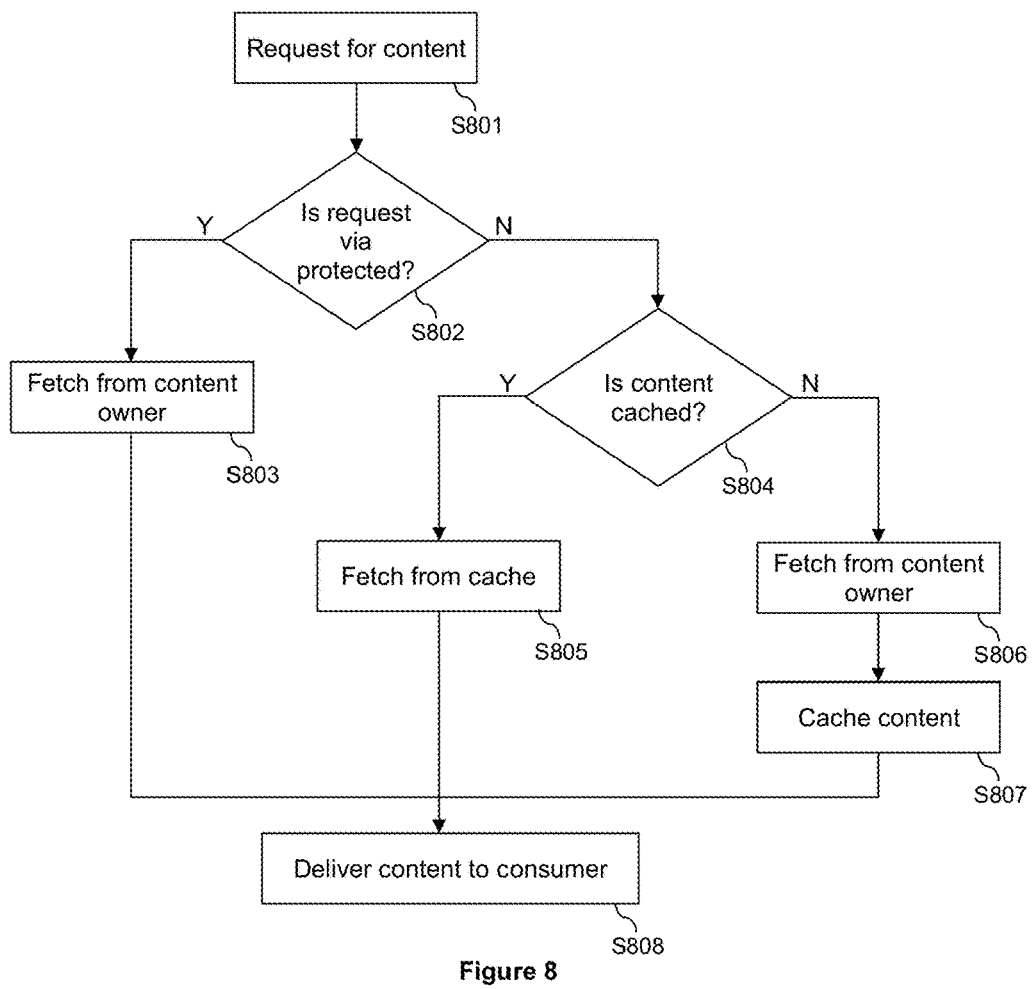
FIG. 8 is a flow chart of the overall process flow of the split-stream technique according to an embodiment of an aspect.

FIG. 8 is a flow chart of the overall process flow of the split-stream technique according to an embodiment of an aspect. A request for content is made at step S801 and it is determined at step S802 whether the request is made via the secure path. If the request is made via the secure path, the content is fetched from the content owner at step S803 and delivered to the consumer at step S808. On the other hand, if the request is not made via the secure path (no at step S802), it is then determined at step S804 if the requested content is cached. It the requested content is cached then it is fetched from the cache at step S805 and delivered to the consumer at step S808. If the requested content has not been cached, it is fetched from the content owner at step S806, cached at step S807 and delivered to the consumer at step S808.

The purpose of a cache is to store content passing over a connection which saves on repeated transfer of the same content. If a cache has a copy of some requested content chunk, then it may serve that content chunk directly from the cache. Otherwise it can pass the request onto the original "owner" of the content. The cache may then receive the content chunk from the owner and pass it on to the requesting client. The cache may also save the content chunk just received so that it can fulfill future requests for the same chunk directly, instead of asking the owner for it.

The content owner may delegate responsibility for authorization of users and delivery of protected content to other entities such as trusted caches, for example, those assumed in the state of the art CDNs described above. Authorization and trust of users can be achieved in the standard manner. This choice of delivery mechanism allows caching of the complete content while taking advantage of the enhanced efficiency of delivery from edge caches and caches embedded in the network.

Note that the unprotected stream (the unprotected chunks of data) can be cached using whatever mechanisms are available in the network; there is no need for any changes to the caching technology to implement caching of the unprotected stream. Embodiments only require changes to the ends of the process to split and combine streams—stream transmittal and caching proceeds without change.

There are a number of ways in which the content may be split into chunks and this may depend on a number of factors, such as, for example, the amount of content, the network, the content source, the user apparatus, etc.

Large files delivered over HTTP are usually transmitted in chunks, with the user making requests for chunks of data as they are required, media streaming protocols (for example, HTTP Live Streaming, HLS) often require that the content is stored in chunks at the server. The user is responsible for requesting the chunks of data by name as required. Files may be stored in a number of versions that can be delivered, taking into account network capability, such as, for example, the bitrates achieved.

If the data is split into chunks so that the absence of a small amount of the data chunks invalidates the whole content, then the split stream technique according to embodiments can be used to protect cached data without requiring changes to the current caching and content delivery mechanisms.

When processing the content to produce the pre-processed chunks, the server software of the content source may apply an algorithm to label each created chunk with a class type: either cacheable (unprotected) or protected. Chunks are always placed into the same class regardless of their bitrate in order to avoid reconstruction of the input by combining different bitrate streams. There can be a variety of selection algorithms such as those described below.

Regular thinning is known to the inventor from related art. To achieve a caching proportion of (1−1/n), every n'th chunk is placed into the protected set. High values of n result in large cacheability, but reduced protection.

Context thinning is an approach according to an embodiment of an aspect. A certain portion of the content is regarded as low importance and therefore does not require protection; such as, for example, inserted advertisements, final credits, etc. All the chunks of data from these sections can be marked as cacheable whilst the remaining sections can be thinned for protection. Similarly, significant portions of the content, such as climatic scenes, may be regarded as high importance and may therefore be aggressively thinned so that a large amount of the chunks of data are marked as protected in order to increase protection, i.e. a large amount of the data is delivered through the secure route. Thus, scenes in video data that are considered to be of high importance may be aggressively thinned. Other examples of high importance data include a drama scene that is thinned more aggressively as the scene progresses and thinning more aggressively in live broadcasts after a camera angle change.

Figure 9:
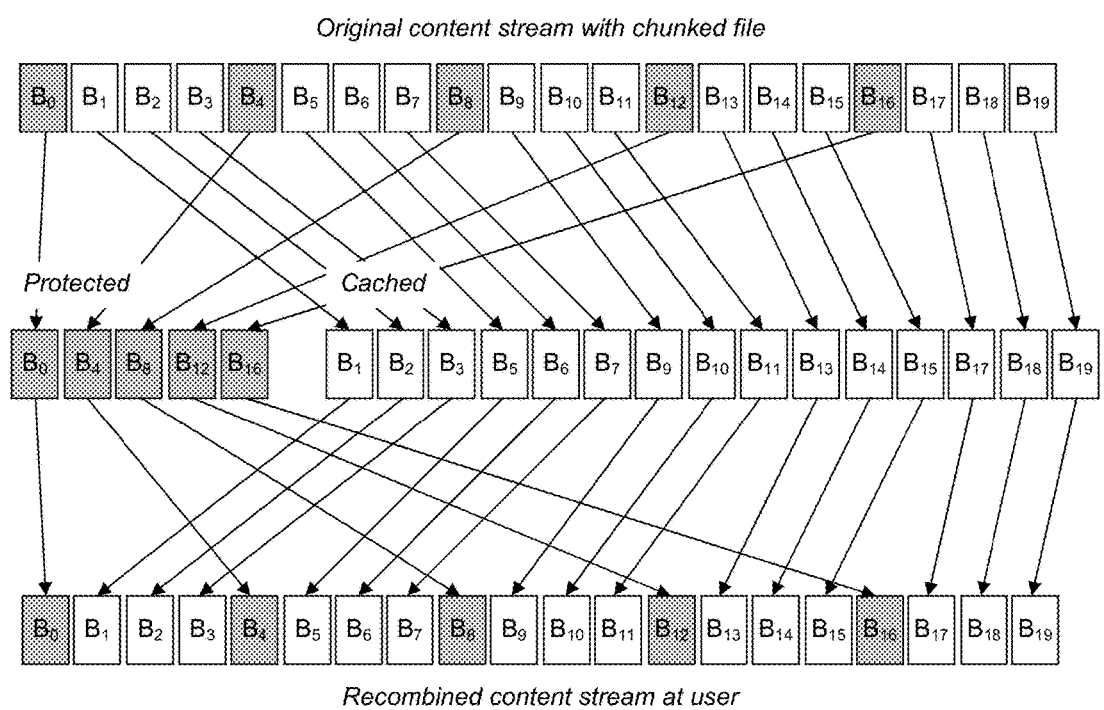
FIG. 9 is a block diagram showing the process for thinning of chunked content according to an embodiment of an aspect.

FIG. 9 is a block diagram showing the process for regular thinning of chunked content according to an embodiment of an aspect. The content is split by the content owner into a number of chunks, B0 to B19 in the first row of the diagram. In this example, every fifth chunk is marked as protected. Protected chunks are held under the control of the content owner and transmitted via the secure path. The remaining chunks of data are unprotected and so can be cached in untrusted caches. This is shown in the second row of diagram. The user manages the requests for the chunks of data, requesting chunks of data via the appropriate path, as required. The chunks of data arrive via the appropriate path, from the appropriate source according to their status of protected or unprotected. The chunks of data can then be recombined for use by the user, as shown in the last row of the diagram.

It is necessary for the user to know the class (protected or unprotected) for each chunk of data so that it can direct requests for the chunks of data to the appropriate stream; to the unprotected caching source or to the protected non-caching source. Streaming protocols may be used to inform the user of the status of chunks of data. For example, HTTP chunked streaming protocols are initiated with the transfer of a manifest file that, at the moment, details the available bit stream rates and chunk names. This manifest file may be extended to include a list of protected chunks.

Alternatively, the client may infer protected chunks using standard protocols. According to preferable embodiments, the content holding server may only deliver protected chunks of data through a protected channel and any request for a protected chunk received through an unprotected route should be refused. If the client makes initial requests for chunks through the unprotected channel, the cache will not hold protected chunks and so will return an error (possibly after being refused access from the server). On receipt of an error, the client may infer that the chunk is protected and request the chunk of data via the protected route.

Figure 10:
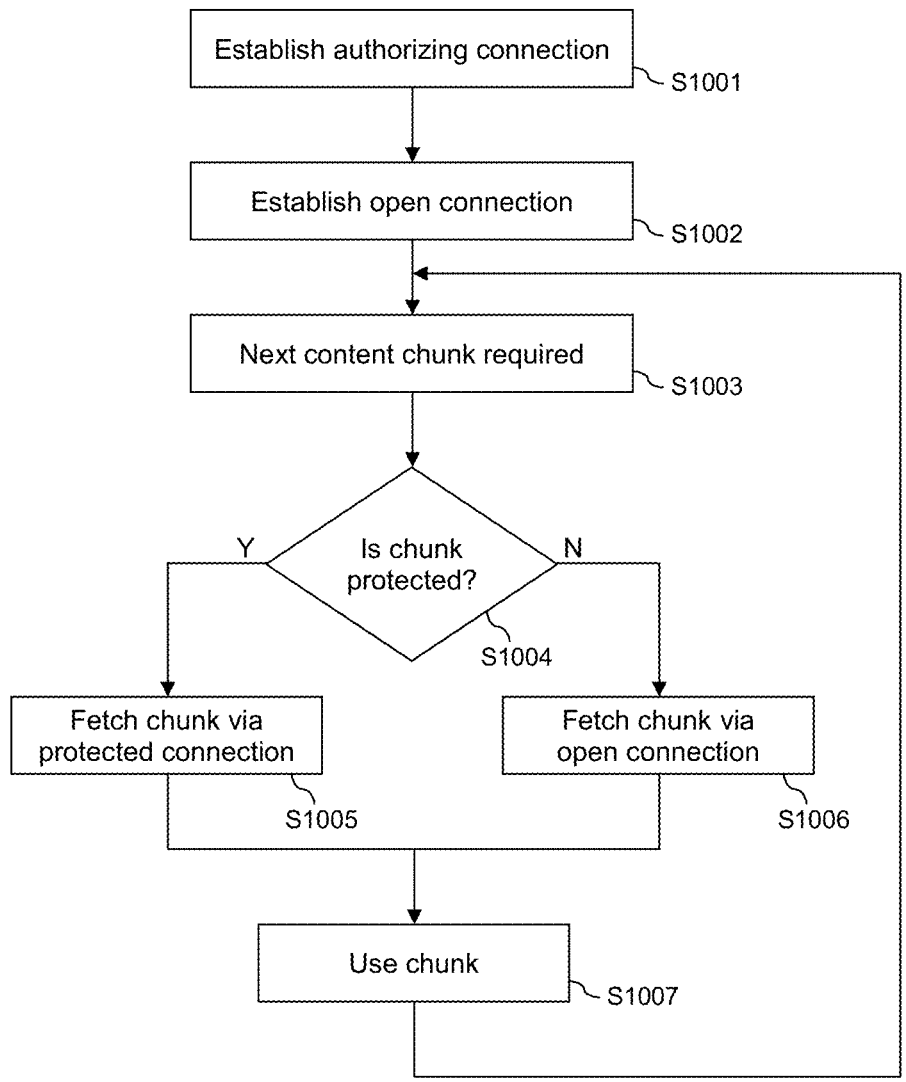
FIG. 10 is a flow chart showing the user process to obtain chunked data using split-stream protection according to an embodiment of an aspect.

FIG. 10 is a flow chart showing the user process to obtain chunked data using split-stream protection according to an embodiment of an aspect. At the first step, S1001, the user establishes a secure connection to the content owner or delegate. The user also establishes a connection to the content owner via an unprotected route at step S1002. At step S1003 the user determines that a new chunk of the content is required and, using one of the techniques outlined above, the user determines if the chunk is protected at step S1004. If the chunk is protected, it is requested through the protected path at step S1005. Otherwise, at step S1006, it is requested through the unprotected path.

Typically, content will almost always be compressed before caching strategies are applied, as this is a more effective way to reduce transmission resource requirements. Compression usually consists of analyzing the content to determine new encodings of the data that, when combined with a decoding table, represent the data in fewer bits than the original data. Applications receiving the compressed data apply the decoding table to the encoded data in order to reconstruct the original content. This strategy may be applied to the whole content but is often applied to portions of the content (for example, to frames or chunks of data) so that multiple decoding tables are transmitted as part of the compressed stream. The encoded part of the compressed stream can be considered to be an encryption of the original data, as it cannot be interpreted without the decoding table. Good decoding tables will be small in comparison to the overall transmitted data.

According to an embodiment of an aspect, the split-stream technique can be applied to such compressed data. As the encoded stream is effectively encrypted, it can be safely stored in untrusted caches. The decoding tables for each block may then be sent over the protected stream.

Figure 11:
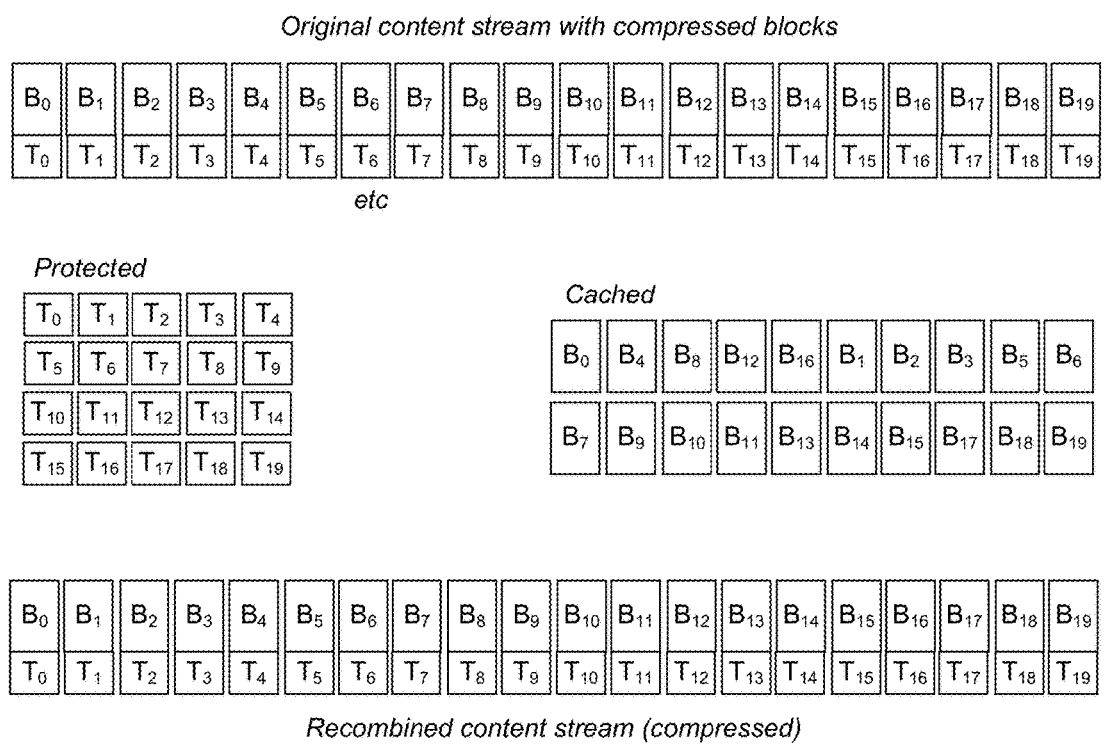
FIG. 11 is a block diagram showing the splitting process for entropy encoded content according to an embodiment of an aspect.

FIG. 11 is a block diagram showing the splitting process for entropy encoded content according to an embodiment of an aspect. The original data steam comprises a number of blocks, each of which are compressed using separate encoding tables (T) to produce encoded data (B). The encoding tables are protected and may be kept in protected storage and transmitted to the user via the secure path. The encoded data is cacheable and so is distributed through unprotected means. This is shown in the second row of the diagram. In the last row of the diagram, the user can apply the decoding tables to the encoded data to reconstruct the original content.

Figure 12:
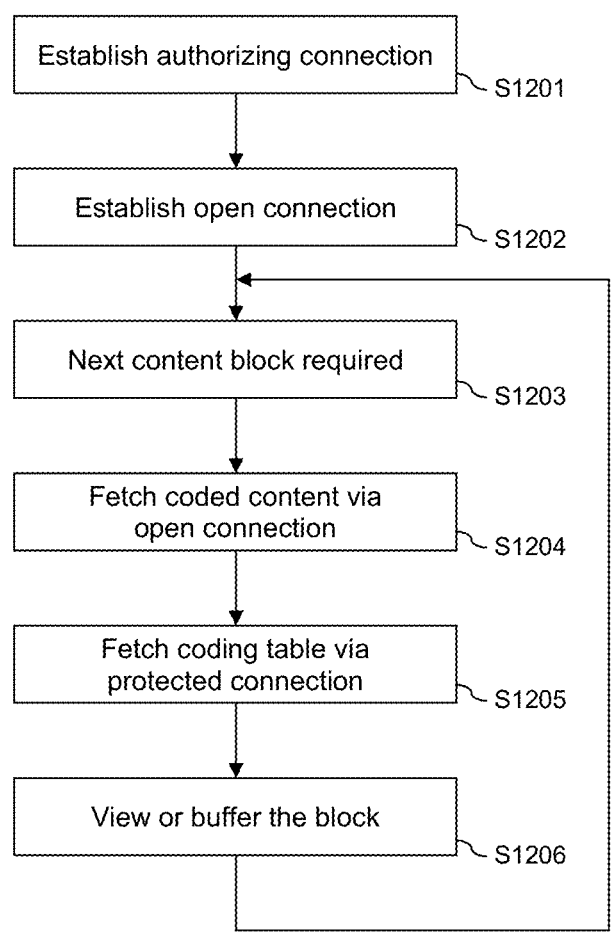
FIG. 12 is a flow chart showing the user process for entropy encoded content using split-stream protection according to an embodiment of an aspect.

FIG. 12 is a flow chart showing the user process for entropy encoded content using split-stream protection according to an embodiment of an aspect, as discussed above. At steps S1201 and S1202 the user establishes a secure connection and an unsecure connection to the content owner, respectively. At step S1203 the user determines that a new chunk of the content is required, with coded content fetched via the open connection at step S1204 and the appropriate coding table fetched via the protected connection at S1205. At step S1206, the content block is viewed, buffered and/or otherwise used by the user.

Embodiments may be applied to video content. Video data achieves a high degree of compressibility by exploiting similarities between successive frames. Much of the content of a frame is exactly the same as the content of the previous frame, since usually only a few objects in a scene are moving. Video compression techniques are able to exploit this by transmitting only the differences between frames. The differences can accumulate, so compressed video streams include periodic transmittals of a complete frame, which are typically encoded as a static image. Succeeding difference frames will use the static image as the base for differences.

Typically, early video stream coder/decoder techniques (codecs) used just two types of frames: key and delta frames. Key frames store the complete frame and were compressed as a static image. Delta frames are encoded by comparing pixels in the frame to be transmitted to pixels in previous frames, keeping non-redundant information. The kept data for each delta frame is also compressed (using static frame techniques) as necessary to meet the target data rate of the file.

More advanced inter-frame techniques, embedded in modern codecs, such as MPEG-2, H.264 and VC-1, use three frame types for compression: I-frames, B-frames, and P-frames. I-frames are the same as key frames and are the largest frame type. B-frames and P-frames are variants of delta frames. P-frames are the simplest, removing redundant information from previous I-frames or P-frames. B-frames are more complex, and remove redundant information from previous or subsequent I-frames, B-frames or P-frames. B-frames are considered the most efficient frame type.

These multiple frame types are stored in a group of pictures (GOP), which starts with each I-frame and includes all frames up to, but not including, the next I-frame. The number and sequence of B-frames and P-frames depends on the coder used together with the desired bitrate and the decoding capabilities of the user.

All these techniques introduce a dependency between frames. If, for example, an I-frame is missing, then the GOP cannot be decoded and any data transmitted for the GOP's P-frames or B-frames will be useless since there is no base frame to which the differences relate. Missing P-frames or B-frames will lead to an incomplete (jerky) video, as only the first frame of a GOP will be seen.

Embodiments of the split-stream technique may be used to separate the video file into one stream with only I-frames and another stream with only P-frames and B-frames. One of the streams is cached and the other is streamed to the user on demand, under rights management by the content owner and via the protected path. The two streams are combined by the user to reproduce the original GOPs and so can be decoded using standard codecs. There is no need for any further protection of the cached portion as the inter-frame dependencies acts as an effective encryption or obfuscation of the video stream. The choice of whether to cache the I-frame stream or the B-frame and P-frame stream is application dependent. The content owner may balance the relative sizes of the streams with the possibly greater security of caching the B-frame and P-frame stream.

Figure 13:
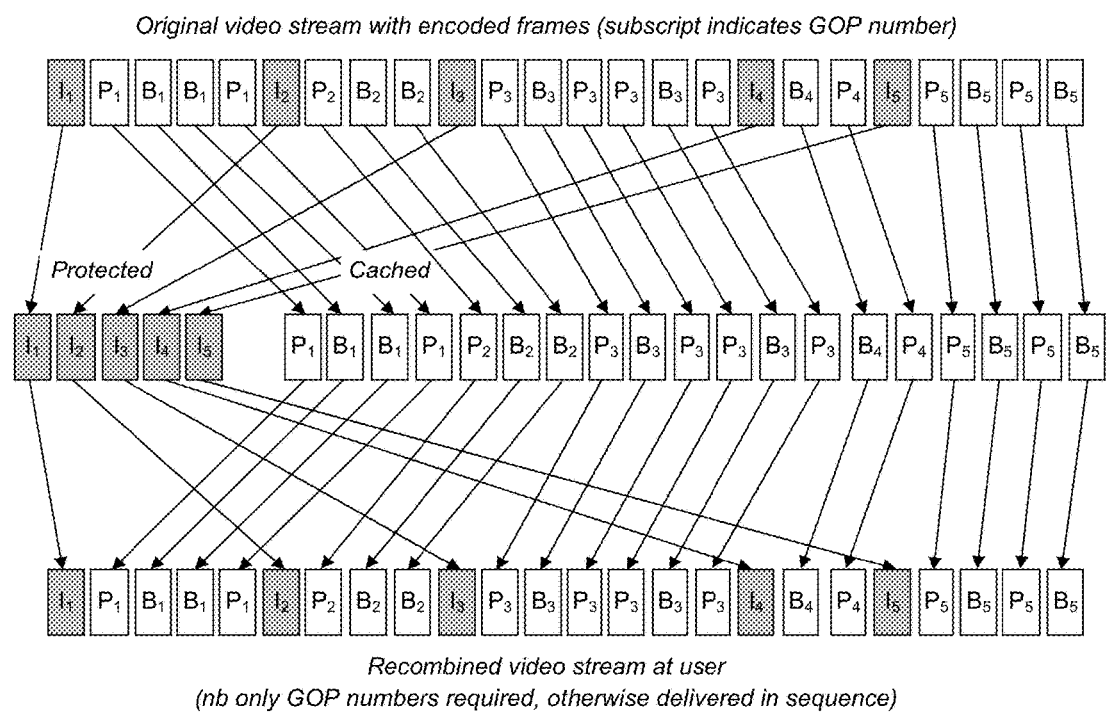
FIG. 13 is a block diagram showing the splitting process for video data according to an embodiment of an aspect.
Figure 14:
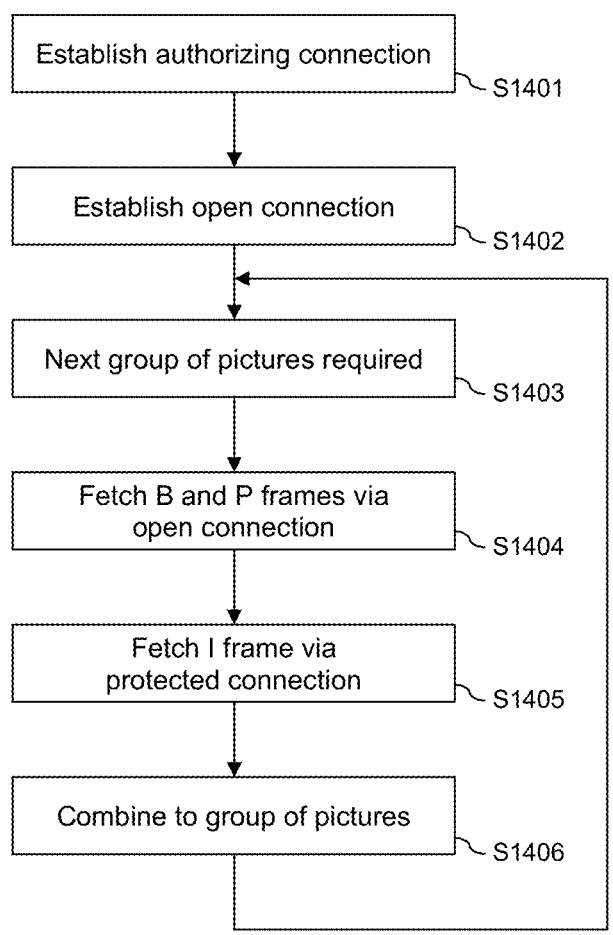
FIG. 14 is flow chart showing the user process for video data according to an embodiment of an aspect.

FIG. 13 is a block diagram showing the splitting process for video data and FIG. 14 is a flow chart showing the user process for video data according to an embodiment of an aspect, as described above.

In FIG. 13, the frames of the video stream are separated. In this example, the I-frame of each GOP is marked as protected, and the B-frames and P-frames are cacheable. This is shown in the second row of diagram. In the last row of the diagram, the frames are recombined in the correct order by the user to obtain the video stream.

In FIG. 14, the process starts with the user establishing a secure connection and an unsecure connection to the content owner at steps S1401 and S1402, respectively. At step S1403 the user determines that the next group of pictures is required. The B-frames and P-frames are fetched via the open connection at step S1404 and the I-frames fetched via the protected connection at step S1405. At step S1406, the frames are combined by the user to construct the group of pictures and obtain the video stream.

According to another embodiment of an aspect, the need to maintain a protected connection between the content owner and the user for the whole of the content delivery process may be removed. In this preferred embodiment, an initial protected session is required where, similarly to current CDNs, the user is authorized to access the content. Once authorized, the user is supplied with a secure token via the protected connection to prove the authorization is valid. The authorization token may, for example, limit access to certain content and/or for a defined time, and/or to certain users and/or to users in a certain location, etc. The user may also optionally acquire a cryptographic key pair, comprising a secret (private) key and a public key, where the standard cryptographic protocols ensure that data encoded with the public key can only be decoded with the matching private key. Once the authorization token has been transferred and, if required, the cryptographic key pair has been negotiated, the protected connection is no longer required.

After the initial authorization period, the user is able to access all of the content using requests over an unprotected connection to the content owner, i.e. protected and unprotected chunks of data are requested via the unsecure path. These requests contain the authorization token and, optionally, the public key supplied in the process above. Caches in the path between the user and owner will serve requests for unprotected chunks as previously described in other embodiments. Protected chunks are not cached and so will pass through the network to the content owner (or its surrogate). On receipt of a request for a protected chunk with a valid authorization token, the content owner encrypts the relevant chunk using the public key and transmits it to the user. Since the protected chunk is encrypted it can only be read by the holder of the matching private key i.e. the intended user.

Note that in this technique, the user must apply different decoding to protected and unprotected chunks. However, if the public key is transmitted with all requests, the cache may encrypt chunks that it serves for the user. In this way the user receives an undifferentiated stream regardless of the chunk's origin, i.e. whether the chunk has been sent from the cache or content owner.

Figure 15:
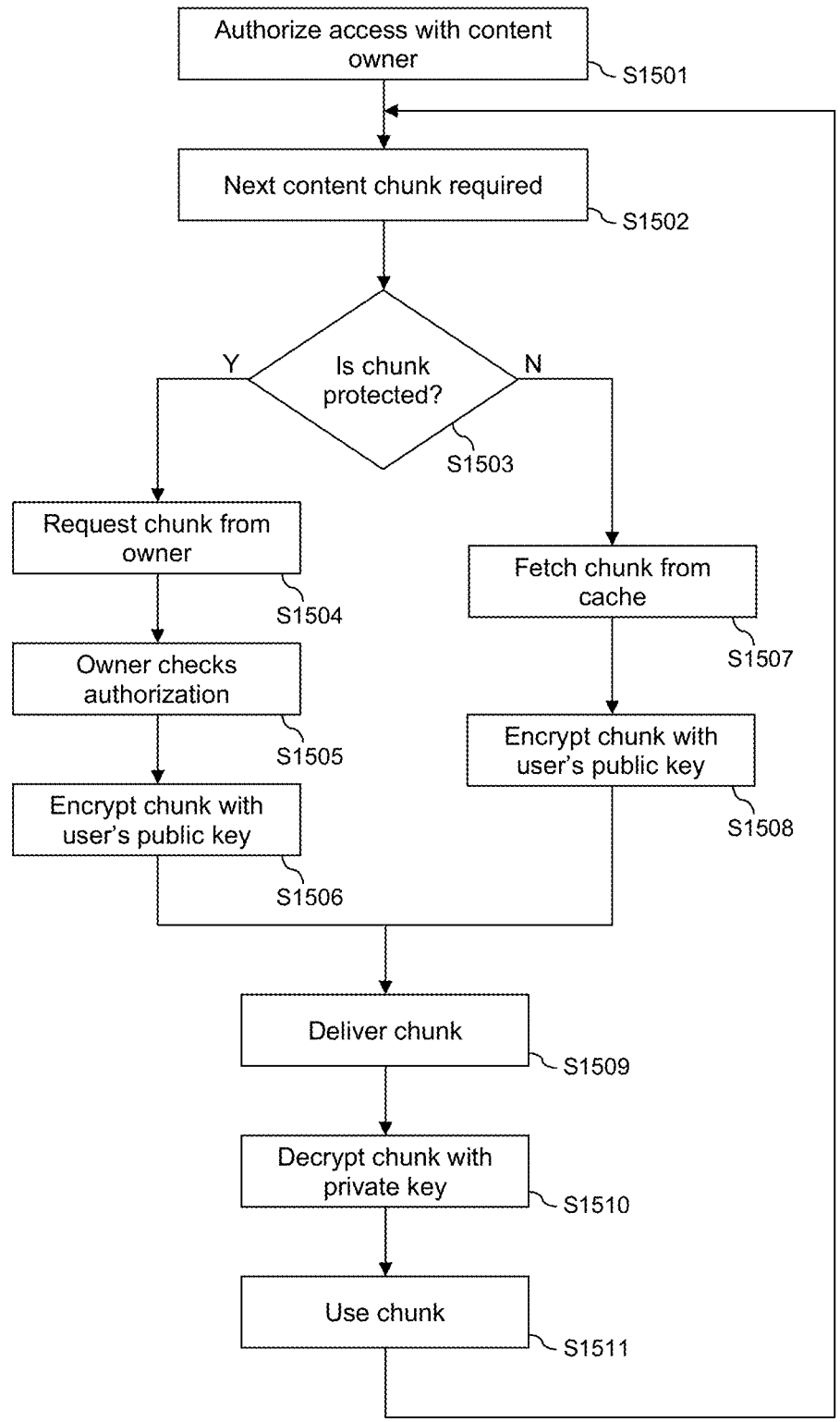
FIG. 15 is a flow chart of the overall process flow of the split-stream technique according to a further embodiment of an aspect.

FIG. 15 is a flow chart of the overall process flow of the split-stream technique according to a further embodiment of an aspect. At step S1501 the user acquires authorization from the content owner. When the next chunk of data is required at step S1502, it is determined whether or not the chunk is protected at step S1503. If the chunk is not protected, it is fetched from the cache at step S1507 and encrypted with the user's public key at step S1508.

The chunk of data may be encrypted by the cache. This may be in order to ensure that the user receives a consistently encrypted stream. Such functionality may be desirable in certain cases so that the user device does not have to apply different processing to the protected and unprotected streams, thus simplifying implementation of a user device.

If the chunk is protected at step S1503, it is requested from the owner at step S1504. The content owner checks the user's authorization at step S1505 and, if authorized, encrypts the chunk with the user's public key at S1506. At step S1509 the encrypted chunk is delivered to the user, and is then decrypted using the private key at step S1510. Finally, the user uses the chunk at step S1511.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A user apparatus configured to request and receive data divided into chunks from a content source over a network, the user apparatus comprising:
   a memory and a processor configured to:
      establish a secure path to the content source and establish an unsecure path to the content source;
      determine that a next chunk of data is required and determine, using a streaming protocol, whether the next chunk of data is marked as one of protected and unprotected;
      request and receive the next chunk of data, wherein the next chunk of data is requested and received via the unsecure path when the next chunk of data is marked as unprotected;
      request authorization from the content source via the secure path;
      receive an authorization token from the content source via the secure path when the authorization is given by the content source; and
      request and receive a chunk of data marked as protected via the unsecure path using the authorization token, wherein the authorization token is useable to limit access to the chunk of data marked as protected based on at least one of a time and a location of one or more users defined in association with the authorization token.

2. The user apparatus according to claim 1, wherein the next chunk of data is requested and received via the secure path when the next chunk of data is marked as protected.

3. The user apparatus according to claim 1, wherein, when the authorization is given by the content source, the processor is configured to negotiate a public key and a private key pair with the content source, and
   the processor is configured to:
      request and receive chunks of data encrypted using the public key; and
      decrypt received encrypted chunks of data using the private key.

4. The user apparatus according to claim 1, wherein the streaming protocol includes a list of chunks of data marked as protected.

5. The user apparatus according to claim 1, wherein the processor is configured to request the next chunk of data via the secure path when an error message is received when the next chunk of data is requested via the unsecure path.

6. The user apparatus according to claim 1, wherein the processor is configured to receive a content hash key from the content source via the secure path and, when a chunk of data is received via the unsecure path, to check integrity of the received chunk of data using the content hash key.

7. The user apparatus according to claim 1, wherein the data comprises encoded chunks of data and one or more decoding tables, and the one or more decoding tables are chunks of data marked as protected and the encoded chunks of data are chunks of data marked as unprotected.

8. A method, in a user apparatus, of requesting and receiving data divided into chunks from a content source over a network, the method comprising:
   establishing a secure path to the content source and establishing an unsecure path to the content source;
   determining that a next chunk of data is required and determining, using a streaming protocol, whether the next chunk of data is marked as one of protected and unprotected;
   requesting and receiving the next chunk of data, wherein the next chunk of data is requested and received via the unsecure path when the next chunk of data is marked as unprotected;
   requesting authorization from the content source via the secure path;
   receiving an authorization token from the content source via the secure path when the authorization is given by the content source; and
   requesting and receiving a chunk of data marked as protected via the unsecure path using the authorization token, wherein the authorization token is useable to limit access to the chunk of data marked as protected based on at least one of a time and a location of one or more users defined in association with the authorization token.

9. A content source apparatus configured to deliver data to a user, the content source apparatus comprising:
   a memory and a processor configured to:
      establish a secure path to the user and to establish an unsecure path to the user;
      split the data into two or more chunks;
      mark chunks of data as one of protected and unprotected; and
      receive a request for a chunk of data of the marked chunks of data and transmit the chunk of data, wherein the chunk of data being transmitted via the unsecure path when the chunk of data is marked as unprotected:
      receive an authorization request from the user via the secure path;

authorize the user by transmitting an authorization token to the user via the secure path; and transmit a protected chunk of data via the unsecure path when the protected chunk of data is requested using the authorization token, wherein the authorization token is useable to limit access to the protected chunk of data based on at least one of a time and a location of the user defined in association with the authorization token.

10. The content source apparatus according to claim 9, wherein the secure path through which the authorization request is received from the user and through which the authorization token is transmitted to the user is different than the unsecure path through which the protected chunk of data is transmitted.

11. The content source apparatus according to claim 10, wherein, when the authorization is given, the processor is configured to:

negotiate a public key and a private key pair with the user;
encrypt the chunk of data using the public key; and
transmit the encrypted chunk of data via the unsecure path when requested using the public key.

12. The content source apparatus according to claim 9, wherein the processor is configured to simultaneously receive requests for and transmit the chunks of data via the secure path and the unsecure path.

13. The content source apparatus according to claim 9, wherein the processor is configured to transmit a content hash key for checking integrity of the chunk of data to the user via the secure path.

14. The content source apparatus according to claim 9, wherein the processor is configured to perform one or more of:

marking all low importance chunks of data as unprotected; and
marking all high importance chunks of data as protected.

15. The content source apparatus according to claim 14, wherein the processor is further configured to mark, chunks of data that have not been marked as protected or marked as unprotected, some of the chunks of data as protected and any remaining chunks of data as unprotected.

16. A method in a content source apparatus of delivering data to a user, the method comprising:

establishing a secure path to the user and establishing an unsecure path to the user;
splitting the data into two or more chunks;
marking chunks of data as one of protected and unprotected; and
receiving a request for a chunk of data of the marked chunks of data and transmitting the chunk of data, wherein the chunk of data being transmitted via the unsecure path when the chunk of data is marked as unprotected;
receiving an authorization request from the user via the secure path;
authorizing the user by transmitting an authorization token to the user via the secure path; and
transmitting a protected chunk of data via the unsecure path when the protected chunk of data is requested using the authorization token, wherein the authorization token is useable to limit access to the protected chunk of data based on at least one of a time and a location of the user defined in association with the authorization token.

17. A communications system comprising:
a user apparatus; and a content source apparatus comprises a memory and processor, the content source apparatus being connected to the user apparatus via a secure path and via an unsecure path, the content source apparatus is configured to:

split data into two or more chunks of data,
mark the two or more chunks of data as one of protected and unprotected,
receive a request for a chunk of data from the user apparatus and deliver the chunk of data to the user apparatus,
receive an authorization request from the user apparatus via the secure path, and
authorize the user apparatus by transmitting an authorization token to the user apparatus via the secure path; and the user apparatus is configured to:

determine, using a streaming protocol, whether a next chunk of data is required and to determine whether the next chunk of data is marked as one of protected and unprotected,
request and receive the next chunk of data via the unsecure path when the next chunk of data is marked as unprotected,
request authorization from the content source via the secure path,
receive an authorization token from the content source via the secure path when the authorization is given by the content source, and
request and receive a chunk of data marked as protected via the unsecure path using the authorization token, wherein the authorization token is useable to limit access to the chunk of data marked as protected based on at least one of a time and a location of one or more users defined in association with the authorization token.

18. The communications system according to claim 17, wherein the unsecure path includes a cache to cache one or more chunks of data and the user apparatus is connected to the content source apparatus via the cache, and wherein the cache is configured to request and receive chunks of data that are not marked as protected from the content source apparatus and to transmit the chunks of data to the user apparatus in response to the request from the user apparatus.

19. A method for use in a communications system, comprising:

splitting, by a content source, data into two or more chunks of data, and marking the two or more chunks of data as one of protected and unprotected;
receiving a request for a chunk of data from a user and delivering the chunk of data to the user;
receiving an authorization request from the user via the secure path, and authorizing the user by transmitting an authorization token to the user via the secure path; and
enabling the user to determine whether a next chunk of data is required and whether the next chunk of data is marked as one of protected and unprotected using a streaming protocol;
requesting and receiving the next chunk of data via an unsecure path when the next chunk of data is marked as unprotected;
requesting authorization from the content source via the secure path;
receiving an authorization token from the content source via the secure path when the authorization is given by the content source; and requesting and receiving a chunk of data marked as protected via the unsecure path using the authorization token, wherein the authorization token is useable to limit access to the chunk of data marked as protected based on at least one of a time and a location of the user defined in association with the authorization token.

20. A non-transitory computer readable storage medium storing a method for a user apparatus of requesting and receiving data divided into chunks from a content source over a network, the method comprising:
- establishing a secure path to the content source and establishing an unsecure path to the content source;
- determining that a next chunk of data is required and determining, using a streaming protocol, whether the next chunk of data is marked as one of protected and unprotected; and
- requesting and receiving the next chunk of data, wherein the next chunk of data is requested and received via the unsecure path when the next chunk of data is marked as unprotected;
- requesting authorization from the content source via the secure path;
- receiving an authorization token from the content source via the secure path when the authorization is given by the content source; and
- requesting and receiving a chunk of data marked as protected via the unsecure path using the authorization token, wherein the authorization token is useable to limit access to the chunk of data marked as protected based on at least one of a time and a location of one or more users defined in association with the authorization token.

21. A method in a user apparatus of requesting and receiving data divided into chunks from a content source over a network, the method comprising:
- establishing a secure path to the content source and establishing an unsecure path to the content source;
- establishing a cache at an edge of the network in the unsecure path;
- determining that a next chunk of data is required and determining, using a streaming protocol, whether the next chunk of data is marked as one of protected and unprotected; and
- requesting and receiving the next chunk of data, wherein the next chunk of data is requested and received from the cache via the unsecure path when the next chunk of data is marked as unprotected,
- requesting authorization from the content source via the secure path;
- receiving an authorization token from the content source via the secure path when the authorization is given by the content source; and
- requesting and receiving a chunk of data marked as protected via the unsecure path using the authorization token source, wherein the authorization token is useable to limit access to the protected chunk of data marked as protected based on at least one of a time and a location of one or more users defined in association with the authorization token.

\* \* \* \* \*